United States Patent [19]

Yoshida

[11] 4,172,621

[45] Oct. 30, 1979

[54] METHOD OF ADJUSTING PRE-LOAD ON OR CLEARANCE IN BEARING, AND BEARING ASSEMBLY CONSTRUCTED BY SAID METHOD

[75] Inventor: Katsuaki Yoshida, Iwata, Japan

[73] Assignee: Toyo Bearing Company, Limited, Osaka, Japan

[21] Appl. No.: 835,189

[22] Filed: Sep. 21, 1977

[30] Foreign Application Priority Data

Sep. 21, 1976 [JP] Japan ................................ 51-113941

[51] Int. Cl.[2] ......................... F16C 33/30; F16C 43/04

[52] U.S. Cl. ........................... 308/207 A; 29/148.4 A; 29/725; 308/189 A; 308/197

[58] Field of Search ........... 308/189 R, 189 A, 207 R, 308/207 A, 197, 211, 214; 29/148.4 A, 725

[56] References Cited

U.S. PATENT DOCUMENTS

| | | | |
|---|---|---|---|
| 2,101,130 | 12/1937 | Christman | 29/148.4 A |
| 3,323,844 | 6/1967 | Hedstrom | 308/189 A |

*Primary Examiner*—Charles E. Frankfort
*Attorney, Agent, or Firm*—Armstrong, Nikaido, Marmelstein & Kubovcik

[57] ABSTRACT

A method of adjusting a pre-load on or a clearance in bearings and a bearing assembly constructed by this method, wherein a wheel hub is fixed to the outer side of a uniform velocity ball joint stem and two angular contact ball bearings or tapered roller bearings are installed between the hub and a steering knuckle. The bearing assembly comprises a spacer disposed between the inner races of the bearings on the hub, and the elastic deformation, plastic deformation and elastic restoring force of the spacer are utilized for pre-loading adjustment or clearance adjustment of the bearings in the bearing assembly.

20 Claims, 11 Drawing Figures

C
A
B
P2
P1
Load
P3
P4
D
0
E
Displacement δ

METHOD OF ADJUSTING PRE-LOAD ON OR CLEARANCE IN BEARING, AND BEARING ASSEMBLY CONSTRUCTED BY SAID METHOD

BRIEF DESCRIPTION OF THE INVENTION (a) Field of the Invention

The present invention relates to a method of adjusting a pre-load on or a clearance in bearings, such as tapered roller bearings or angular contact ball bearings, to a predetermined value when said bearings are installed, and also to a bearing assembly constructed by said method.

(b) Description of the Prior Art

Generally, the front wheels of a front wheel drive vehicle in which the engine is disposed in the front of the vehicle and the front wheels are drive wheels, or the rear wheels of a vehicle having all the four wheels independently suspended are each constructed in such a manner that, as shown in FIG. 1, a wheel hub 2 is fixed to the outer side of a uniform velocity ball joint stem 1 and two angular contact ball bearings or tapered roller bearings installed between said hub 2 and a steering knuckle 3. Generally, such uniform velocity ball joint, i.e., shaft, housing and bearing have their respective machining tolerances, making it necessary to provide means for adjusting the excessive clearance or means for eliminating the clearance and giving a pre-load when bearings are mounted.

An excessive amount of pre-load on the bearing shortens the life of the bearing and increases the torque required, which results in the generation of heat and an increase in fuel cost for the vehicle. Thus, the amount of pre-load is suitably about 300 kg, the lower limit being such as to give zero or some clearance. Since an increased clearance influences the vibration, toe-in and camber of the wheel, only a narrow range of clearance is allowed. Since the distance between the associated edges of the inner and outer bearing races (hereinafter referred to as the edge distance) is influenced by all the characteristics of the bearing, including the race width and surface and rolling body dimension, making the range of clearance narrower necessitates making the present machining level (accuracy) much severer. However, it is difficult to achieve a machining level for the various characteristics which is severer than the present level. Actually, therefore, the edge distance is compensated by size selection or by adjustment of the spacer size or by using a hard seal 5 conforming to the edge distance as shown in FIG. 2. With this method, however, it is necessary to machine the spacer to a suitable axial thickness, and to keep a stock of spacers with various axial thicknesses. As a result, the assembling cost becomes higher.

SUMMARY OF THE INVENTION

The present invention relates to a method of adjusting a pre-load on or clearance in bearings, comprising disposing a spacer between the inner races of the bearings of a bearing assembly which comprises a shaft, a housing and a pair of rolling contact bearings disposed between said shaft and housing, compressing said inner bearing races as by a press to subject the spacer to elastic deformation and then to plastic deformation, relieving the load when as predetermined bearing torque is obtained, and tightening a nut or the like to provide a predetermined pre-load and hence a predetermined clearance.

FEATURES OF THE INVENTION

A feature of the present invention is that irrespective of the amount of the bearing edge distance, the use of a spacer having a widthwise dimension which may vary in a relatively large range is possible and the pre-load and clearance can be accurately adjusted, thus lowering the manufacturing cost.

Another feature of the invention is that by utilizing spacers obtained through the invention, the adjustment of bearing assemblies of various sizes is possible using a single kind of spacers, the need for keeping a stock of spacers is eliminated and the adjustment of bearing pre-load or clearance can be made rapidly and easily.

A further feature of the invention is that it can be applied to the rear wheel bearings of an independent suspension type vehicle, to bearings for the pinion of a final speed reducing device and to other bearings where pre-load or clearance adjustments are required. The invention is useful particularly when large quantities are handled.

DESCRIPTION OF THE PREFERRED EMBODIMENTS

Figure 3A:
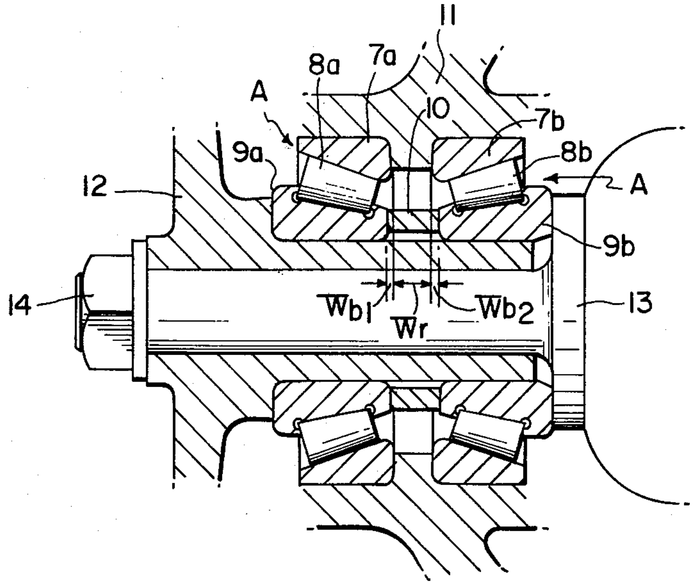
FIGS. 3A and 3B are sectional views of the principal parts of two embodiments of the present invention.
Figure 3B:
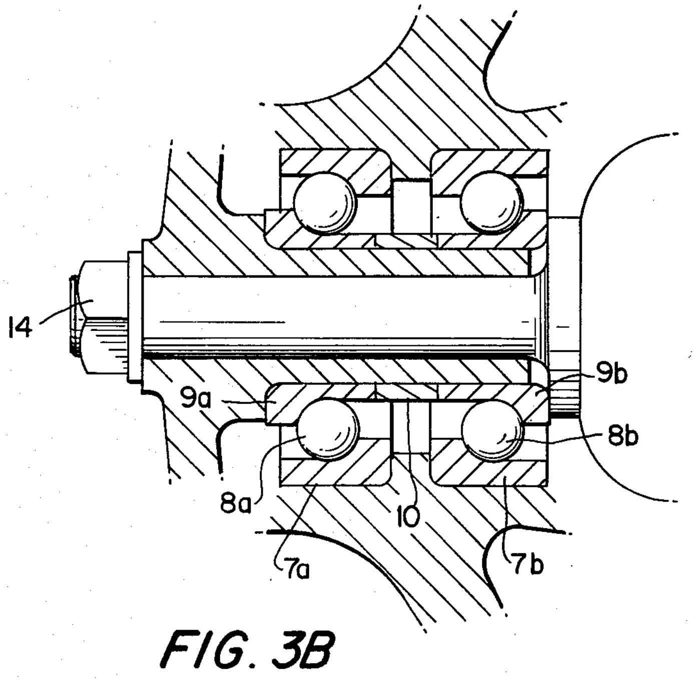
Figure 4:
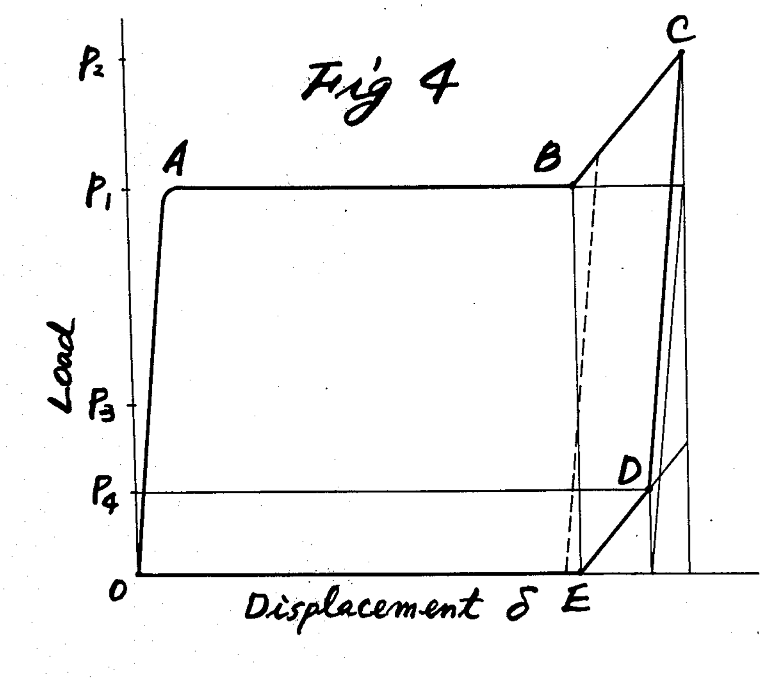
FIG. 4 is a view showing the relation between the load and the displacement in the embodiment shown in FIG. 3.
Figure 5B:
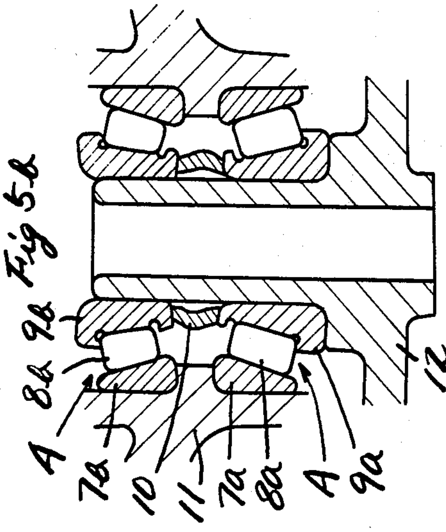
**FIGS. 5*a*–5*d*** are views for explanation of the adjusting order according to the invention.
Figure 5D:
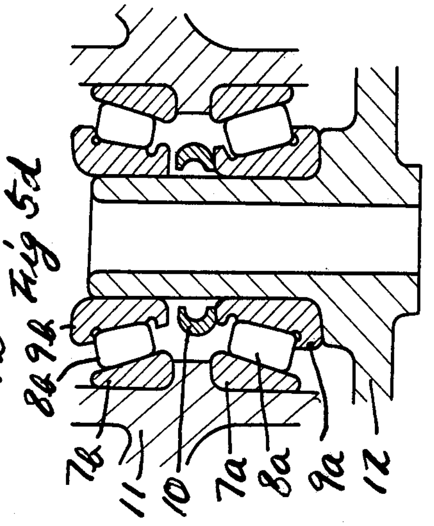
Figure 5A:
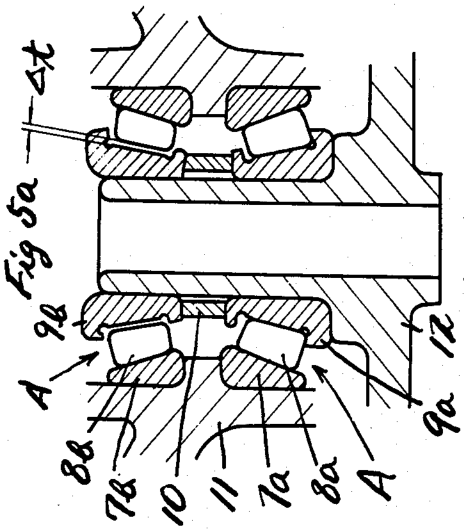
Figure 5C:
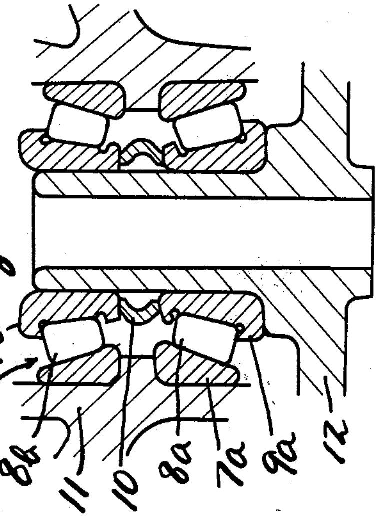

Referring to FIGS. 3, 4 and **5*a*–5*d*, A designates a bearing assembly; 7*a* and 7*b* designate outer bearing races; 8*a* and 8*b* designate rolling bodies; 9*a* and 9*b* designate bearing inner races; 10 designates a cylindrical spacer made of an aluminum alloy or other metal; 11 designates a steering knuckle; 12 designates a wheel hub; 13 designates a shaft; and 14 designates a nut. The size of the spacer 10 is about 0.5–5 mm larger than the sum (WR+Wb1+Wb2) of the flange width Wr of the knuckle 11 and individual bearing edge distances Wb1 and Wb2**.

FIG. 3A shows the use of tapered roller bearings and FIG. 3B shows the use of angular contact ball bearings; but the following description refers to the use of tapered roller bearings, the use of angular contact ball bearings being substantiallly the same.

Figure 7:
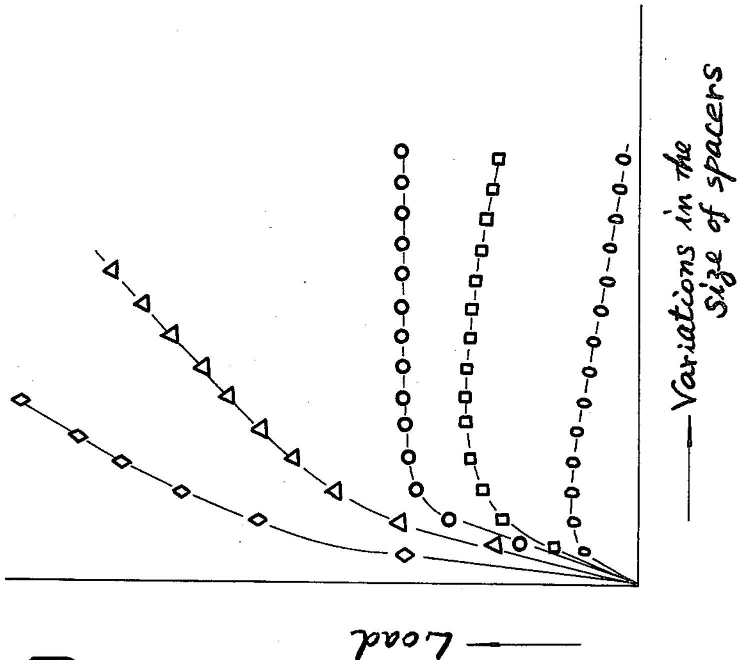
FIG. 7 is an explanatory view showing loads and variations in the size of spacers.
Figure 2:
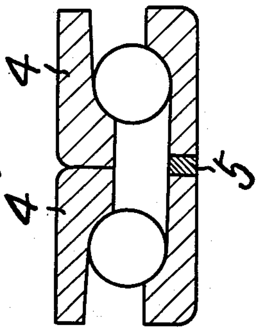
FIG. 2 is an enlarged sectional view of the bearing part thereof.
Figure 6:
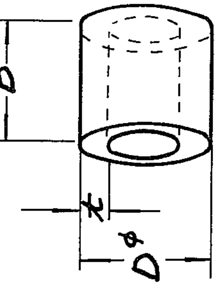
FIG. 6 is a perspective view of a spacer used in the invention.
Figure 1:
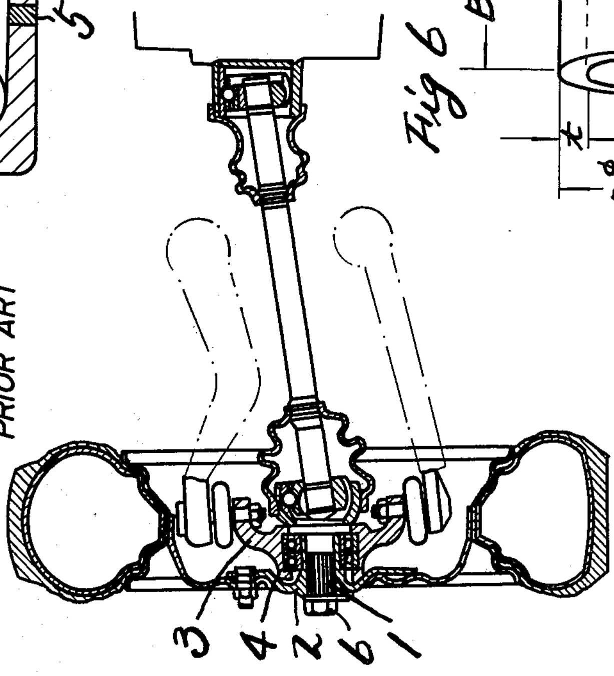
FIG. 1 is a view showing a front axle of a vehicle for explanation of an example of the prior art.

First of all, the inner race 9 is press-fitted in the wheel hub and the two outer races **7*a* and 7*b* are then also press-fitted in the steering knuckle 11. Subsequently, the spacer 10, which has a width somewhat larger than the distance between the inner races, is inserted adjacent the inner race 9*a* mounted on the wheel hub 12, and the inner 9*b* is then press- or clearance-fitted. In this condition, the hub shaft 12 is vertically secured to an exclusive-purpose press, as shown in FIG. 5 (*a*). A jig (not shown) is placed in contact with the inner bearing race 9*b* and loaded by the press. As a result, the axial load is transmitted from the hub shaft 12 to the inner bearing race 9*a* and spacer 10 and then to the inner bearing race 9*b*, with an equal reaction produced. The width of the spacer which will buckle under this load 10 is about 0.5–5 mm greater than the distance between the inner races which is determined by the known bearing edge distance and steering knuckle flange width, said spacer being made of an aluminum alloy or other metal. With this spacer 10 utilized, when the hub shaft is vertically placed, the outer race of the upper bearing descends under the weight of the steering knuckle and the rollers also descend under their own weight until they come in contact with the outer-race surface. Therefore, a clearance Δt is produced between the inner-race surface and the rollers, as shown in FIG. 5** (*a*). When the inner-race width surface is depressed as by a press, the load is transmitted by way of the inner race—spacer—inner race. During the time the load is in the elastic deformation range of the spacer (the range OA shown in FIG. 4), the deformation of the spacer is small, so that the upper bearing has still some clearance between the inner-race surface and the rollers as in the above mentioned condition. As the load increases to P1 where the compressive stress in the spacer exceeds the elastic limit, a large dimensional change takes place as in the region AB in FIG. 4, causing the spacer to buckle into a barrel shape as shown in FIG. 5 (*b*). It is desirable that the movement in the region AB be horizontal as viewed in the graph, i.e., that the load do not vary regardless of the dimensional change of the spacer. In the case where the spacer is in the form of a cylinder which is the simplest form, as shown in FIG. 6, it can be achieved when the four factors, i.e., the outer diameter D, thickness t, width B and material, are in a certain relation. The o marks in FIG. 7 refer to a case where these values are suitable, and with the outer diameter D maintained unchanged, if t is made larger and B smaller than in this relation, then the compressive force surpasses the buckling as shown by the ◇ marks and Δ marks. Therefore, in order for the dimensional change of the spacer to increase, the load should be increased. On the other hand, if t is smaller and B is larger, the buckling proceeds as shown by the □ marks and 0 marks and when the dimensional spacer change exceeds a certain value, the load gradually decreases.

By selecting suitable values for the four factors as described above, it is possible to obtain bucklable spacer capable of maintaining the load constant regardless of changes in the size of the spacer. By way of example, suitable values for the four factors are as follows.

Material: copper-containing aluminum alloy
D: 39.5 mm
t: 1.5 mm
B: 8.5 mm

Each has its allowable value. Therefore, with any sizes selected hereafter, it is easy to provide cylindrical spacers with the above characteristics.

As the buckling of the spacer proceeds as described above, at point B in FIG. 4 the internal clearance of the upper bearing becomes zero as shown in FIG. 5 (*c*) and thereafter as the spacer is deformed the buckling of the spacer proceeds while the bearings also elastically deform to share in the load, so that the load increases again, but a movement shown by BC in FIG. 4 will be exhibited if a load (P2 - P1) which is somewhat greater than the scheduled bearing pre-load is added. When the load is at P2, if the above spacer is used the load on the bearing assembly A is (P2 - P1). In this case, with spacers having other characteristics than those shown by the o marks in FIG. 7, the bearing load (P2 - P1) will not be constant.

As the load acting on the bearing assembly A and spacer 10 is removed, this load varies along CD and then DE. In the region CD, mainly the load portion on the spacer 10 decreases, while in the region DE, mainly the load portion on the bearing assembly A is removed. And at point E, zero load condition is established. The displacement OE is the plastic deformation value for the spacer 10 shown in FIG. 5 (*d*).

The method of adjusting a load on and a clearance in a bearing according to the present invention, as described above, uses bearings including a wheel hub 12 and a steering knuckle 11, which are in actual use, and a spacer 10 and causes the spacer to buckle to the proper size. Thereafter, the load is once removed, and then the assembly is inserted into a uniform velocity ball joint stem and clamped by the nut 14 with a torque which is within given limits, whereby the bearing pre-load takes a predetermined value. With P3 designating the axial clamping force exerted by the nut, if P3 is greater than P4 and smaller than P1, then a pre-load which is approximately P4 (actually, slightly smaller than P4) is applied to the bearing without the buckling of the spacer proceeding any further, with P3 - P4 shared in by the spacer. Similarly, if P1 is large and the value P2 - P1 is less than the predetermined value, then the elastic restoration of the spacer is greater than that of the bearings, as shown in broken line in FIG. 4, so that when the assembly is tightened again by the nut, if the clamping force P3 is smaller than a certain value some clearance remains in the bearing interior, thus providing for clearance adjustment. Therefore, with the adjusting method according to the present invention, the clamping torque (load) for pre-loading the bearings can be set in a wide range between P1 and P4. Further, the pre-load on the bearings can be substantially determined by the load (P2 - P1) at BC as described above and by attaching a special device to the press it is easy to give the accurate load and select the proper value for the pre-load on the bearings.

While there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

What is claimed is:

1. A method of adjusting a pre-load on a bearing assembly including a shaft, a housing, a pair of rolling contact bearings having inner races disposed therebetween, and a spacer interposed between said inner races of said bearings, wherein the spacer is characterized by a load-displacement curve which is approximately horizontal during plastic deformation, said method comprising the steps of, compressing said inner bearing races to cause the spacer to deform plastically to such an extent that the bearing clearance is zero, then applying an additional load which is slightly greater in magnitude than the desired pre-load value, then removing the load and finally, clamping the inner bearing races with any load which exceeds the desired pre-load value but which does not exceed a load under which the spacer will be subjected to plastic deformation so as to provide a predetermined pre-load.

2. A method as set forth in claim 1, wherein said spacer is made of a metal.

3. A method as set forth in claim 1, wherein said spacer is made of an aluminum alloy.

4. A method as set forth in claim 1, wherein said spacer has an annular cylindrical shape.

5. A method as set forth in claim 1, wherein the width of said spacer is 0.5–5 mm longer than the distance between the inner races of said pair of bearings.

6. A method of adjusting, a clearance in a bearing assembly including a shaft, a housing, a pair of rolling contact bearings having inner races disposed therebetween, and a spacer interposed between said inner races of said bearings, wherein the spacer is characterized by a load-displacement curve which is approximately horizontal during plastic deformation, said method comprising the steps of, compressing the inner bearing races to cause the spacer to deform plastically to such an extent that the bearing clearance is zero, then applying an additional load, removing the additional load and finally, clamping the inner bearing races with any load which does not exceed a load under which the bearing clearance is taken up again so as to provide a predetermined clearance.

7. A method as set forth in claim 6, wherein said spacer is made of a metal.

8. A method as set forth in claim 6, wherein said spacer is made of an aluminum alloy.

9. A method as set forth in claim 6, wherein said spacer has an annular cylindrical shape.

10. A method as set forth in claim 6, wherein the width of said spacer is 0.5–5 mm longer than the distance between the inner races of said pair of bearings.

11. A bearing assembly comprising a shaft, a housing, a pair of rolling contact bearings having inner races disposed therebetween, and a spacer disposed between the inner races of said bearings, said spacer being characterized by a load-displacement curve that is approximately horizontal during plastic deformation wherein the pre-load on the bearings having been set by causing the spacer to deform plastically to such an extent that the bearing clearance is zero, then applying an additional load which is slightly greater in magnitude than the desired pre-load value, then removing the load and finally, clamping the inner bearing races with any load which exceeds the desired pre-load value but which does not exceed a load under which the spacer will be subjected to plastic deformation.

12. A bearing assembly as set forth in claim 11, wherein said spacer is made of a metal.

13. A bearing assembly as set forth in claim 11, wherein said spacer is made of an aluminum alloy.

14. A bearing assembly as set forth in claim 11, wherein said spacer has an annular cylindrical shape.

15. A bearing assembly as set forth in claim 11, wherein the width of said spacer is 0.5–5 mm longer than the distance between the inner races of said pair of bearings.

16. A bearing assembly comprising a shaft, a housing, a pair of rolling contact bearings having inner races disposed therebetween and a spacer interposed between said inner races of said bearings, said spacer being characterized by a load-displacement curve that is approximately horizontal during plastic deformation, wherein the clearance in the bearings having been set by causing the spacer to deform plastically to such an extent that the bearing clearance is zero, then applying an additional load, then removing the additional load and finally, clamping the inner bearing races with any load which exceeds the desired pre-load value but which does not exceed a load under which the spacer will be subjected to plastic deformation.

17. A bearing assembly as set forth in claim 16, wherein said spacer is made of a metal.

18. A bearing assembly as set forth in claim 16, wherein said spacer is made of an aluminum alloy.

19. A bearing assembly as set forth in claim 16, wherein said spacer has an annular cylindrical shape.

20. A bearing assembly as set forth in claim 16, wherein the width of said spacer is 0.5–5 mm longer than the distance between the inner races of said pair of bearings.

* * * * *

UNITED STATES PATENT AND TRADEMARK OFFICE

CERTIFICATE OF CORRECTION

PATENT NO. : 4,172,621

DATED : October 30, 1979

INVENTOR(S) : YOSHIDA

It is certified that error appears in the above-identified patent and that said Letters Patent are hereby corrected as shown below:

On the cover page, Item [73], change "Toyo Bearing Company, Limited," to --- NTN Toyo Bearing Company, Limited, ---

Signed and Sealed this

*Fourth* Day of *March 1980*

[SEAL]

*Attest:*

SIDNEY A. DIAMOND

*Attesting Officer* *Commissioner of Patents and Trademarks*